(12) United States Patent
Perichon et al.

(10) Patent No.: US 11,165,354 B2
(45) Date of Patent: Nov. 2, 2021

(54) POWER CONVERTER COMPRISING AT LEAST ONE NORMALLY-ON TRANSISTOR

(71) Applicant: Commissariat à l'Energie Atomique et aux Energies Alternatives, Paris (FR)

(72) Inventors: Pierre Perichon, Grenoble (FR); Sébastien Carcouet, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/775,469

(22) Filed: Jan. 29, 2020

(65) Prior Publication Data

US 2020/0251996 A1 Aug. 6, 2020

(30) Foreign Application Priority Data

Feb. 1, 2019 (FR) ..................................... 1900987

(51) Int. Cl.
*H02M 3/335* (2006.01)
*H02M 1/36* (2007.01)

(52) U.S. Cl.
CPC ......... *H02M 3/33569* (2013.01); *H02M 1/36* (2013.01)

(58) Field of Classification Search
CPC ........ H02M 1/32; H02M 1/36; H02M 1/4258; H02M 7/537; H02M 2001/0045; H02M 2001/0067; H02M 2001/008
USPC ........ 363/16, 17, 34, 36, 37, 39, 40, 49, 53, 363/56.02, 56, 71, 89, 97–98, 131–132; 318/139, 375–381, 752–762, 801–812; 361/91.1–91.3, 56, 58, 84, 90, 106, 110, 361/111, 187
See application file for complete search history.

(56) References Cited

U.S. PATENT DOCUMENTS 5,847,940 A * 12/1998 Heeringa ................ H02J 7/022 363/19
6,118,676 A * 9/2000 Divan ................... H02J 3/1814 363/34
6,178,101 B1 * 1/2001 Shires ................ H02M 1/4208 363/39

(Continued)

OTHER PUBLICATIONS

Preliminary Search Report for French Application No. 1900987, dated Oct. 28, 2019, 2 pages.

(Continued)

*Primary Examiner* — Thienvu V Tran
*Assistant Examiner* — Nusrat Quddus
(74) *Attorney, Agent, or Firm* — Moreno IP Law LLC

(57) ABSTRACT

The instant disclosure concerns a power converter including a capacitor having first and second electrodes respectively coupled to first and second input terminals via a current-limiting element; at least one normally-on transistor; a circuit for powering a circuit for controlling the normally-on transistor; and a switch configurable to, in a first configuration, couple first and second input terminals of the power supply circuit, respectively to the first and second input terminals of the converter, upstream of the current-limiting element and, in a second configuration, connect the first and second input terminals of the power supply circuit respectively to the first and second electrodes of the capacitor, downstream of the current-limiting element.

12 Claims, 2 Drawing Sheets

(56) References Cited

U.S. PATENT DOCUMENTS

| | | | | |
|---|---|---|---|---|
| 6,956,751 B2* | 10/2005 | Youm | | H02M 1/32 |
| | | | | 318/375 |
| 7,285,927 B2* | 10/2007 | Kuramochi | | H02P 3/04 |
| | | | | 188/158 |
| 8,040,096 B2* | 10/2011 | Taniguchi | | B60L 3/003 |
| | | | | 318/490 |
| 9,155,232 B2* | 10/2015 | Gasperi | | H02H 9/005 |
| 9,270,192 B2* | 2/2016 | Barauna | | H02M 7/003 |
| 9,509,231 B2* | 11/2016 | Zhu | | H02M 5/4585 |
| 9,515,546 B2* | 12/2016 | Awane | | H02M 1/32 |
| 9,601,945 B2* | 3/2017 | Hall | | B66B 11/04 |
| 2004/0008530 A1* | 1/2004 | Kitahata | | H02M 7/53873 |
| | | | | 363/131 |
| 2008/0253154 A1* | 10/2008 | Schiene | | H02M 1/42 |
| | | | | 363/50 |
| 2009/0212726 A1* | 8/2009 | Baudesson | | H02M 5/458 |
| | | | | 318/400.3 |
| 2009/0290396 A1* | 11/2009 | Carcouet | | H02M 7/06 |
| | | | | 363/126 |
| 2010/0085757 A1* | 4/2010 | Barkdoll | | F21V 21/26 |
| | | | | 362/282 |
| 2010/0295523 A1* | 11/2010 | Grbovic | | H02M 1/08 |
| | | | | 323/282 |
| 2011/0084674 A1* | 4/2011 | Cadoux | | H02M 5/458 |
| | | | | 323/282 |
| 2011/0187332 A1* | 8/2011 | Salvestrini | | H05B 47/10 |
| | | | | 323/234 |
| 2012/0163056 A1* | 6/2012 | Busch | | H02M 1/126 |
| | | | | 363/128 |
| 2013/0016540 A1 | 1/2013 | Barauna | | |
| 2015/0372585 A1 | 12/2015 | Kutschak et al. | | |
| 2017/0222561 A1* | 8/2017 | Ivankovic | | H02M 1/44 |
| 2018/0054071 A1* | 2/2018 | Lasagni | | H02H 9/001 |
| 2018/0367029 A1* | 12/2018 | Maruyama | | H02M 1/32 |
| 2019/0288539 A1* | 9/2019 | Vela Garcia | | B60L 53/60 |
| 2019/0348833 A1* | 11/2019 | Sun | | H02M 1/4258 |

OTHER PUBLICATIONS

D. Peftitsis, "Self-Powered Gate Driver for Normally ON Silicon Carbide Junction Field-Effect Transistors Without External Power Supply," IEEE Transactions on Power Electronics, vol. 28, No. 3, Mar. 2013, pp. 1488-1501.

F. Dubois, "Ultrafast Safety System to Turn-Off Normally on SiC JFETs," Proceedings of the 2011 14th European Conference on Power Electronics and Applications, Aug. 2011, 10 pages.

* cited by examiner

POWER CONVERTER COMPRISING AT LEAST ONE NORMALLY-ON TRANSISTOR

FIELD

The present disclosure generally relates to the field of power converters, and more particularly aims at a power converter comprising at least one normally-on transistor.

BACKGROUND

Many power converter architectures (voltage and/or current converter) comprising one or a plurality of field-effect transistors controlled in switched mode (in all or nothing) to ensure the regulation of an output signal are known. Such converters are also called switched-mode converters.

Conventionally, the transistors used in such converters are formed based on silicon. These generally are normally-off transistors, that is, transistors which are non-conductive in the absence of a control signal on their gate.

New generations of power transistors are however now available, based on semiconductor materials having a bandgap greater than that of silicon, particularly silicon carbide (SiC) and, more recently, gallium nitride (GaN).

The high performance of such new components (low on-state resistance, high switching speed, high temperature resistance) enables to significantly improve the converter performance.

In practice, in such technologies, the transistors having the highest performance and which are the simplest to form are normally-on transistors, that is, conductive in the absence of a control signal on their gate.

In most known switched-mode converter architectures, the use of normally-on transistors to replace conventional normally-off transistors raises issues, particularly during converter start and stop phases.

SUMMARY

Thus, an embodiment provides a power converter comprising:

first and second terminals of application of an input signal;

a power storage capacitor having first and second electrodes respectively connected to the first and second terminals of application of the input signal via a current limiting element;

at least one normally-on transistor;

a power supply circuit capable of generating a signal for powering a circuit of control of said at least one normally-on transistor; and a switch configurable to, in a first configuration, couple first and second input terminals of the power supply circuit respectively to the first and second terminals of application of the input signal, upstream of the current-limiting element and, in a second configuration, connect the first and second input terminals of the power supply circuit respectively to the first and second electrodes of the storage capacitor, downstream of the current-limiting element.

According to an embodiment, the converter is configured to, during a converter starting phase:
control the switch to the first configuration;
when the voltage supplied by the power supply circuit is sufficient, block said at least one normally-on transistor; and then
when the voltage across the storage capacitor exceeds a first predetermined threshold, control the switch to the second configuration.

According to an embodiment, the converter is configured to, during a converter stop phase:
block said at least one normally-on transistor and hold the switch in the second configuration; and then
when the voltage across the storage capacitor falls under a second predetermined threshold, control the switch to the first configuration.

According to an embodiment, the input signal applied to the first and second input terminals of the converter is an AC voltage.

According to an embodiment, the current-limiting element comprises an input inductance and/or an inrush current limiting resistor.

According to an embodiment, the switch comprises a double-throw electromechanical relay.

According to an embodiment, the converter comprises an AC/DC conversion stage comprising a first controlled bridge comprising a first branch comprising first and second normally-on transistors in series between the first and second electrodes of the storage capacitor and, in parallel with the first branch, a second branch comprising first and second switches in series between the first and second electrodes of the storage capacitor, the junction point of the first and second normally-on transistors of the first branch and the junction point of the first and second switches of the second branch being respectively coupled to the first and second terminals of application of the input voltage of the converter via the current-limiting element.

According to an embodiment, the converter further comprises a DC/DC conversion stage comprising a second controlled bridge comprising a first branch comprising third and fourth normally-on transistors in series between the first and second electrodes of the storage capacitor and, in parallel with the first branch, a second branch comprising fifth and sixth normally-on transistors in series between the first and second electrodes of the storage capacitor.

According to an embodiment, the DC/DC conversion stage further comprises a transformer comprising a primary winding comprising first and second ends respectively coupled to the junction point of the third and fourth normally-on transistors of the first branch of the second bridge and to the junction point of the fifth and sixth normally-on transistors of the second branch of the second bridge, via a resonant circuit.

According to an embodiment, the transformer of the DC/DC conversion stage further comprises a secondary winding comprising first and second ends respectively coupled to first and second output terminals of the converter via a rectifying diode bridge.

According to an embodiment, the power supply circuit is a self-oscillating circuit comprising a transformer comprising a primary winding series-coupled with a switching transistor, at least one first secondary winding supplying the signal for powering the control circuit of said at least one normally-on transistor, and a second secondary winding supplying a control signal of the switching transistor.

According to an embodiment, the power supply circuit further comprises a rectifying diode bridge comprising first and second input nodes respectively coupled to the first and second input terminals of the power supply circuit, and first and second output nodes respectively coupled to first and second ends of the series association of the primary winding of the transformer of the power supply circuit and of the switching transistor.

According to an embodiment, the power supply circuit further comprises a smoothing capacitor in parallel with the series association of the primary winding of the transformer of the power supply circuit and of the switching transistor.

The foregoing and other features and advantages will be discussed in detail in the following non-limiting description of specific embodiments in connection with the accompanying drawings.

DETAILED DESCRIPTION OF THE PRESENT EMBODIMENTS

Figure 1:
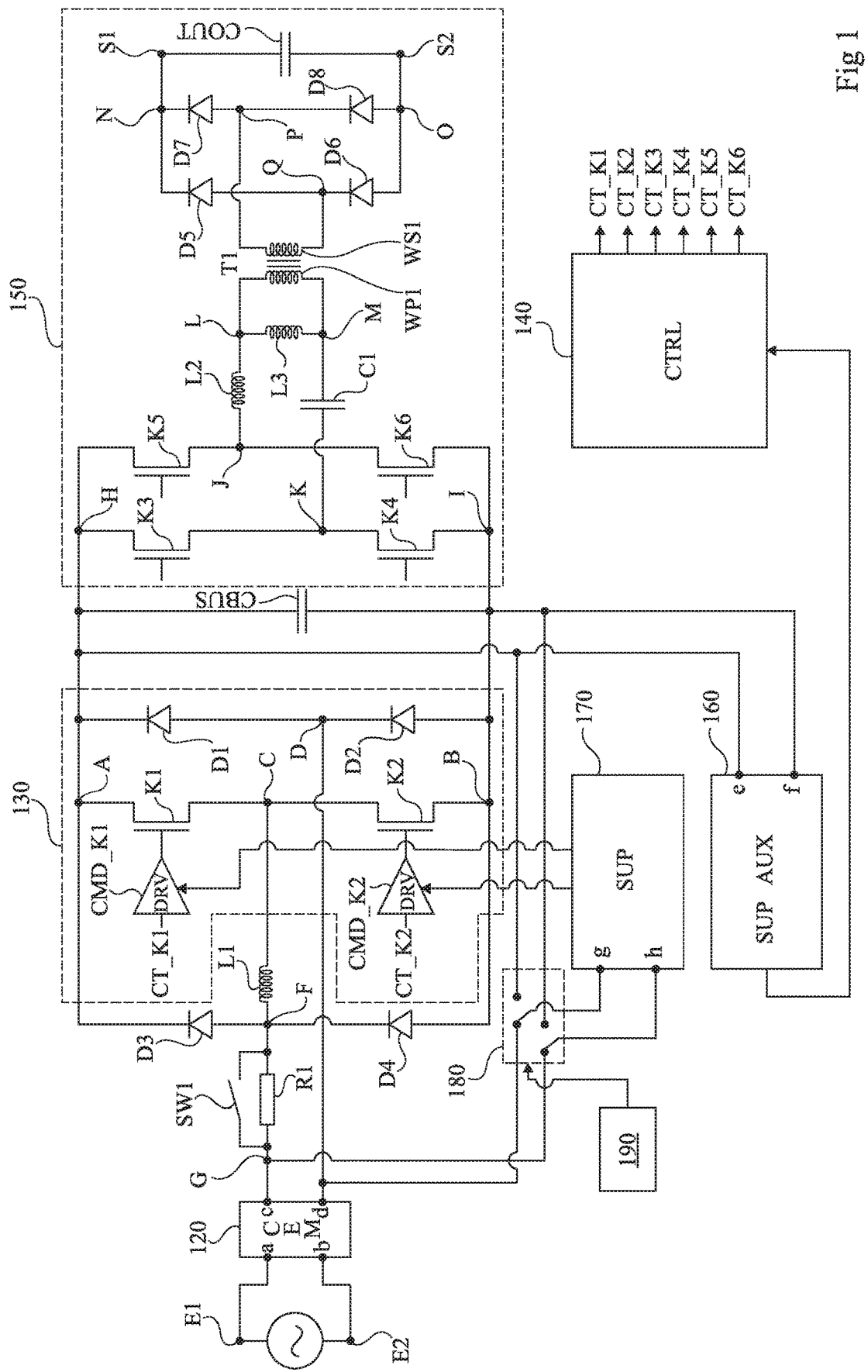
FIG. 1 is an electric diagram of an example of a switched-mode converter according to an embodiment.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the forming of the normally-on transistors of the described converters has not been detailed, the described embodiments being compatible with all or most of known structures of normally-on transistors.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

The terms "about", "approximately", "substantially", and "in the order of" are used herein to designate a tolerance of plus or minus 10%, preferably of plus or minus 5%, of the value in question.

FIG. 1 is an electric diagram of a power converter according to an embodiment.

In this example, an AC/DC-type voltage converter comprising an AC/DC conversion stage 130, also called power factor correction stage, and a DC/DC galvanic insulation conversion stage 150, have been considered.

Stage 130 comprises a controlled bridge comprising a first branch comprising two transistors K1 and K2 series-coupled between nodes A and B of the converter and, in parallel with the first branch, a second branch comprising two diodes D1 and D2 series-coupled between nodes A and B. More particularly, in this example, diode D1 has its cathode coupled, preferably connected, to node A and its anode coupled, preferably connected, to the cathode of diode D2, and diode D2 has its anode coupled, preferably connected, to node B. Further, in this example, transistor K1 has a first conduction node coupled, preferably connected, to node A and a second conduction node coupled, preferably connected, to a first conduction node of transistor K2, and transistor K2 has a second conduction terminal coupled, preferably connected, to node B. The junction point of transistors K1 and K2 defines a node C of the converter, and the junction point of diodes D1 and D2 defines a node D of the converter.

Nodes A and B form output nodes of stage 130 and are coupled, preferably connected, respectively to first and second electrodes of a power storage capacitor CBUS.

Nodes C and D, forming input nodes of stage 130, are respectively coupled to terminals E1 and E2 of application of an AC input voltage of the converter, for example, a sine-wave voltage, for example, a voltage having an amplitude in the order of 230 volts and a frequency in the order of 50 Hz, for example, the mains voltage.

The converter further comprises an input inductance L1 coupling node C to node E1. More particularly, inductance L1 has a first end coupled, preferably connected, to node C, and a second end coupled, preferably connected, to a node F, node F being itself coupled to node E1.

In this example, the converter further comprises an inrush current limiting resistor R1 series-coupled with inductance L1 between node C and node E1. More particularly, in this example, resistor R1 has a first end coupled, preferably connected, to node F, and a second end coupled, preferably connected, to a node G, node G being itself coupled to node E1.

In the shown example, the converter further comprises a circuit for filtering possible electromagnetic disturbances 120 (CEM). Circuit 120 comprises terminals a and b coupled, preferably connected, respectively to input terminals E1 and E2 of the converter, and terminals c and d respectively coupled to nodes C and D of the converter. In this example, the terminals c and d of filtering circuit 120 are coupled, preferably connected, respectively to node F and to node D of the converter.

In the example of FIG. 1, the converter further comprises a switch SW1, for example, a series association of two head-to-tail normally-off transistors, or an electromechanical relay, coupled in parallel with resistor R1 between nodes G and F. More particularly, in the present example, switch SW1 has a first conduction node coupled, preferably connected, to node G and a second conduction node coupled, preferably connected, to node F. The converter of FIG. 1 further comprises a diode D3 forward-connected between nodes F and A, and a diode D4 reverse-connected between nodes F and B. More particularly, diode D3 has its anode coupled, preferably connected, to node F and its cathode coupled, preferably connected, to node A, and diode D4 has its anode coupled, preferably connected, to node B and its cathode coupled, preferably connected, to node F. Diodes D3 and D4, switch SW1, and resistor R1 form a circuit for pre-charging capacitor CBUS.

In the present example, the transistors K1 and K2 of stage 130 are normally-on field-effect transistors, for example, transistors based on silicon carbide or transistors based on gallium nitride. Stage 130 further comprises, for each of transistors K1 and K2, a driver (DRV) CMD_K1, respectively CMD_K2, capable of receiving a logic control signal CT_K1, respectively CT_K2, from a control circuit 140 (CTRL) of the converter, for example, a microcontroller, and of accordingly controlling the turning off or the turning on of transistor K1, respectively K2, by application of an appropriate voltage between the gate and the source of the transistor, for example, a negative voltage in the order of from −10 to −30 volts to turn off the transistor, and a substantially zero voltage to turn on the transistor.

DC/DC conversion stage 150 comprises a controlled bridge comprising a first branch comprising two transistors K3 and K4 series-coupled between nodes H and I of the converter and, in parallel with the first branch, a second branch comprising two transistors K5 and K6 series-coupled between nodes H and I. More particularly, in the present example, transistor K3 has a first conduction node coupled, preferably connected, to node H and a second conduction node coupled, preferably connected, to a first conduction node of transistor K4, and transistor K4 has a second conduction node coupled, preferably connected, to node I. Further, transistor K5 has a first conduction node coupled, preferably connected, to node H and a second conduction node coupled, preferably connected, to a first conduction node of transistor K6, and transistor K6 has a second conduction node coupled, preferably connected, to node I.

Nodes H and I form input nodes of stage 150 and are coupled, preferably connected, respectively to output nodes A and B of stage 130.

The junction point between transistors K5 and K6 defines a node J of the converter, and the junction point of transistors K3 and K4 defines a node K of the converter. Nodes J and K are coupled to an LLC-type resonator comprising an association of two inductances L2 and L3 and of a capacitor C1. More particularly, in the present example, inductance L2 has a first end coupled, preferably connected, to node J and a second end coupled, preferably connected, to a node L, inductance L3 has a first end coupled, preferably connected, to node L and a second end coupled, preferably connected, to a node M, and capacitor C1 has a first electrode coupled, preferably connected, to node M and a second electrode coupled, preferably connected, to node K.

Stage 150 further comprises an insulation transformer T1 comprising a primary winding WP1 and a secondary winding WS1 coupled together by electromagnetic coupling. In this example, the primary winding WP1 of transformer T1 is connected in parallel with the inductance L3 of the LLC resonator. More particularly, in the present example, winding WP1 has a first end coupled, preferably connected, to node L and a second end coupled, preferably connected, to node M. It should be noted that in practice, inductance L3 is not necessarily a specific component but may be formed by the magnetizing inductance of transformer T1. Similarly, inductance L2 is not necessarily a specific component but may be formed by the leakage inductance of the transformer, node L then being connected to node J.

Stage 150 further comprises, at the output of transformer T1, a rectifying diode bridge comprising a first branch comprising two diodes D5 and D6 series-coupled between nodes N and O and, in parallel with the first branch, a second branch comprising two diodes D7 and D8 series-coupled between nodes N and O. More particularly, diode D5 has its cathode coupled, preferably connected, to node N and its anode coupled, preferably connected, to the cathode of diode D6, and diode D6 has its anode coupled, preferably connected, to node O. Further, in this example, diode D7 has its cathode coupled, preferably connected, to node N and its anode coupled, preferably connected, to the cathode of diode D8 and diode D8 has its anode coupled, preferably connected, to node O.

The junction point of diodes D7 and D8 defines a node P of the converter, and the junction point of diodes D5 and D6 defines a node Q of the converter. Nodes P and Q form input nodes of the diode bridge and are coupled, preferably connected, respectively to a first end and to a second end of the secondary winding WS1 of transformer T1. Nodes N and O form output nodes of the diode bridge and are coupled, preferably connected, respectively to output terminals S1 and S2 of the converter.

The DC/DC conversion stage 150 further comprises a capacitor COUT coupled, preferably connected, between the output terminals S1 and S2 of the converter.

The transistors K3, K4, K5, and K6 of the circuit of DC/DC conversion stage 150 are normally-on field-effect transistors, for example, of the same type as transistors K1 and K2. In the same way as for transistors K1 and K2, stage 150 may further comprise, for each of transistors K3, K4, K5, and K6, a driver (not detailed in the drawing) capable of receiving a logic control signal CT_K3, respectively CT_K4, respectively CT_K5, respectively CT_K6 from converter control circuit CTRL, and of accordingly controlling the turning off or the turning on of the transistor by application of an appropriate voltage between the gate and the source of the transistor, for example, a negative voltage in the order of from −10 to −30 volts to turn off the transistor, and a substantially zero voltage to turn on the transistor.

The converter comprises an auxiliary power supply circuit 160 (SUP AUX) supplying a DC power supply voltage to converter control circuit 140. Auxiliary power supply circuit 160 comprises input power supply terminals e and f coupled, preferably connected, respectively across capacitor CBUS, that is, to nodes A and B. Circuit 160 comprises a DC/DC conversion circuit (not detailed) converting the DC voltage supplied by stage 130 across capacitor CBUS into a DC voltage capable of powering control circuit 140, for example, in the range from 3 to 15 volts.

The converter further comprises a power supply circuit 170 (SUP) supplying a DC power supply voltage to each of the circuits for controlling transistors K1, K2, K3, K4, K5, and K6 of the converter. Power supply circuit 170 comprises input terminals g and h.

The converter further comprises a switch 180 configurable to, in a first configuration, couple the input terminals g and h of circuit 170 respectively to the input terminals E1 and E2 of the converter, upstream of at least one element limiting the charge current of capacitor CBUS and, in a second configuration, connect the input terminals g and h of circuit 170 across capacitor CBUS, that is, respectively to nodes A and B. In the example of FIG. 1, filtering circuit 120, resistor R1 and inductance L1 respectively form three elements for limiting the charge current of capacitor CBUS. In this example, in the second configuration, switch 180 connects the terminals g and h of circuit 170 respectively to the nodes G and D of the converter, that is, upstream of resistor R1 and of inductance L1, and downstream (with respect to input terminals E1 and E2) of filtering circuit 120.

Thus, in the first configuration of switch 180, power supply circuit 170 receives on its terminals g and h an AC power supply voltage (the input voltage of the converter filtered by electromagnetic compatibility filter 120) and, in the second configuration of switch 180, power supply circuit 170 receives on its terminals g and h a DC power supply voltage (the voltage across capacitor CBUS). Circuit 170 comprises a conversion circuit (not detailed in FIG. 1) converting the AC or DC voltage applied to its input terminals g and h into a DC voltage capable of powering the circuits for controlling transistors K1, K2, K3, K4, K5, and K6, for example, in the range from −10 to −30 volts.

Switch 180 is for example formed by means of a double-throw electromechanical relay. The converter of FIG. 1 further comprises a circuit 190 capable of controlling switch 180 to one or the other of the first and second configurations.

The operation of the converter of FIG. 1 will now be described.

When the converter is stopped (no voltage applied between its inputs terminals E1 and E2), the normally-on transistors K1, K2, K3, K4, K5, and K6 are on, capacitor CBUS is discharged (zero voltage thereacross), switch SW1 is turned off, and switch 180 is in the first configuration (terminals g and h of the power supply circuit respectively coupled to input terminals E1 and E2 of the converter). Since power supply circuit 170 receives no power supply voltage, the circuits for controlling transistors K1, K2, K3, K4, K5, and K6 are not powered, whereby transistors K1, K2, K3, K4, K5, and K6 cannot be blocked. Power supply circuit 160 does not receive a power supply voltage either, whereby control circuit 140 is not powered.

In such conditions, an AC input voltage, for example, the mains voltage, may be applied between the input terminals E1 and E2 of the converter, at any phase angle. This marks the beginning of a converter starting phase.

The current then increases in resistor R1, inductance L1, and in transistors K1, K2, K3, K4, K5, and K6. At this stage, capacitor CBUS cannot charge since its electrodes are bypassed by transistors K1, K2, K3, K4, K5, and K6. Transistors K1, K2, K3, K4, K5, and K6 should then be turned off as fast as possible, before the current that they conduct becomes too high, to avoid their destruction. In particular, gallium nitride transistors are particularly sensitive since their breakdown power is approximately from 100 to 200 times lower than that of silicon carbide transistors, and approximately 10 times lower than that of silicon transistors. As an example, the bypass current flowing through K1, K2, K3, K4, K5 and/or K6 should not exceed 20 amperes, which requires in this example being able to turn off transistors K1, K2, K3, K4, K5, and K6 within less than from 10 to 30 µs in the case of a sine-wave AC voltage having an amplitude in the order of 230 volts and a frequency in the order of 50 Hz and for an inductance L1 having a value in the order of from 300 to 400 µH.

The power supply of the circuits for controlling transistors K1, K2, K3, K4, K5, and K6 is supplied by circuit 170, which is powered at this stage by the AC input voltage of the converter. As soon as the level of the output power supply voltage supplied to the circuits for controlling transistors K1, K2, K3, K4, K5, and K6 is sufficient to ensure the turning-off of the transistors, the latter are automatically turned off. Indeed, since control circuit 140 is not powered yet, the control signals CT_K1, CT_K2, CT_K3, CT_K4, CT_K5, and CT_K6 applied to the circuits for controlling transistors K1, K2, K3, K4, K5, and K6 are low-level signals, corresponding to signals for controlling the turning-off of the transistors.

Once transistors K1, K2, K3, K4, K5, and K6 are off, capacitor CBUS charges via resistor R1 and diodes D3, D4, D1, and D2.

When the voltage across capacitor CBUS reaches a first predetermined starting threshold TH1_START, corresponding to the minimum operating level of auxiliary power supply circuit 170, for example, in the order of 10 volts, circuit 190 controls switch 180 to the second configuration, to connect the power supply terminals g and h of power supply circuit 170 to the terminals of capacitor CBUS.

When the voltage across capacitor CBUS reaches a sufficient level, for example, greater than threshold TH1_START, the control circuit 140 powered by auxiliary power supply circuit 160 starts.

When the voltage across capacitor CBUS reaches a second predetermined starting threshold TH2_START greater than the first threshold, switch SW1 is turned on to bypass precharge resistor R1. This marks the end of the converter starting phase. Threshold TH2_START may be set according to the breakdown voltage of diodes D1, D2, D3, and D4. More particularly, threshold TH2_START is selected to be sufficiently close to the peak value of the AC input voltage of the converter (in the order of 325 volts for an AC input voltage of 230 volts rms), so that the current drawn at the turning on of switch SW1 is smaller than the maximum current that diodes D1, D2, D3, and D4 can withstand with no degradation. As an example, TH2_START is in the range from 70 to 95 percent of the peak value of the AC input voltage of the converter.

In steady state, control circuit 140 controls transistors K1 and K2 alternately to the off state and to the on state to ensure a substantially sinusoidal absorption of the current by the converter. The voltage across capacitor CBUS is maintained at a substantially constant value called nominal full charge value of capacitor CBUS, typically in the order of 400 volts for a sine-wave AC input voltage having an amplitude in the order of 230 volts and a frequency in the order of 50 Hz. The H bridge formed by transistors K3, K4, K5, and K6 is alternately controlled in a first configuration where transistors K3 and K6 are on and transistors K4 and K5 are off, and in a second configuration where transistors K3 and K6 are off and transistors K4 and K5 are on, to ensure the transformation of the DC voltage supplied across capacitor CBUS into a DC voltage of different level supplied across capacitor COUT.

During a converter stop phase, the AC input voltage of the converter is cut off, at any phase angle.

As long as the voltage across capacitor CBUS is greater than a first predetermined stop threshold TH1_STOP, for example, in the range from 70 to 95 percent of the nominal full charge voltage of capacitor CBUS, for example, in the order of 350 volts for a sine-wave input voltage having an amplitude in the order of 230 volts and a frequency in the order of 50 Hz, the converter operation is maintained identical to the steady state operation. This enables not to interrupt the converter operation in case of a transient drop of the input voltage, for example, in the case of brownouts of the input voltage for a time period in the range from a few milliseconds to a few tens of milliseconds.

When the voltage across capacitor CBUS falls under the first stop threshold TH1_STOP, switch SW1 is turned off, to allow a sure restarting of the converter in the case of an unexpected return of the input voltage. Further, transistors K1, K2, K3, K4, K5, and K6 are off.

As long as the voltage across capacitor CBUs is greater than a second predetermined stop threshold TH2_STOP smaller than first threshold TH1_STOP, depending of the power behavior of transistors K1, K2, K3, K4, K5, and K6 in short-circuit state (for example, in the order of 12 volts for a capacitor CBUS having a capacitance in the order of 1 mF, for gallium nitride transistors K1, K2, K3, K4, K5, and K6 having a breakdown power in short-circuit state in the order of 0.1 J/cm2, and for a transistor surface area in the order of 0.5 cm2), the circuits for controlling transistors K1, K2, K3, K4, K5, and K6 keep on being powered by power supply circuit 170, control circuit 140 keeps on being powered by auxiliary power supply circuit 160, and transistors K1, K2, K3, K4, K5, and K6 are kept off. Since the quantity of power stored in capacitor CBUS may be very high, it must indeed be awaited for capacitor CBUS to be sufficiently discharged to be able to release the control of transistors K1, K2, K3, K4, K5, and K6 and thus short-circuit capacitor CBUS. To accelerate the discharge of capacitor CBUS during the stop phase, a specific discharge circuit, not shown, may possibly be provided.

When the voltage across capacitor CBUS falls under second stop threshold TH2_STOP, power supply circuits 160 and 170 stop operating, causing the turning on of transistors K1, K2, K3, K4, K5, and K6 and the full discharge of capacitor CBUS through the transistors. Circuit 190 then controls switch 180 to the first configuration, to couple the power supply terminals g and h of power supply circuit 170 respectively to the input terminals E1 and E2 of the converter.

The converter is thus in a starting condition again.

Figure 2:
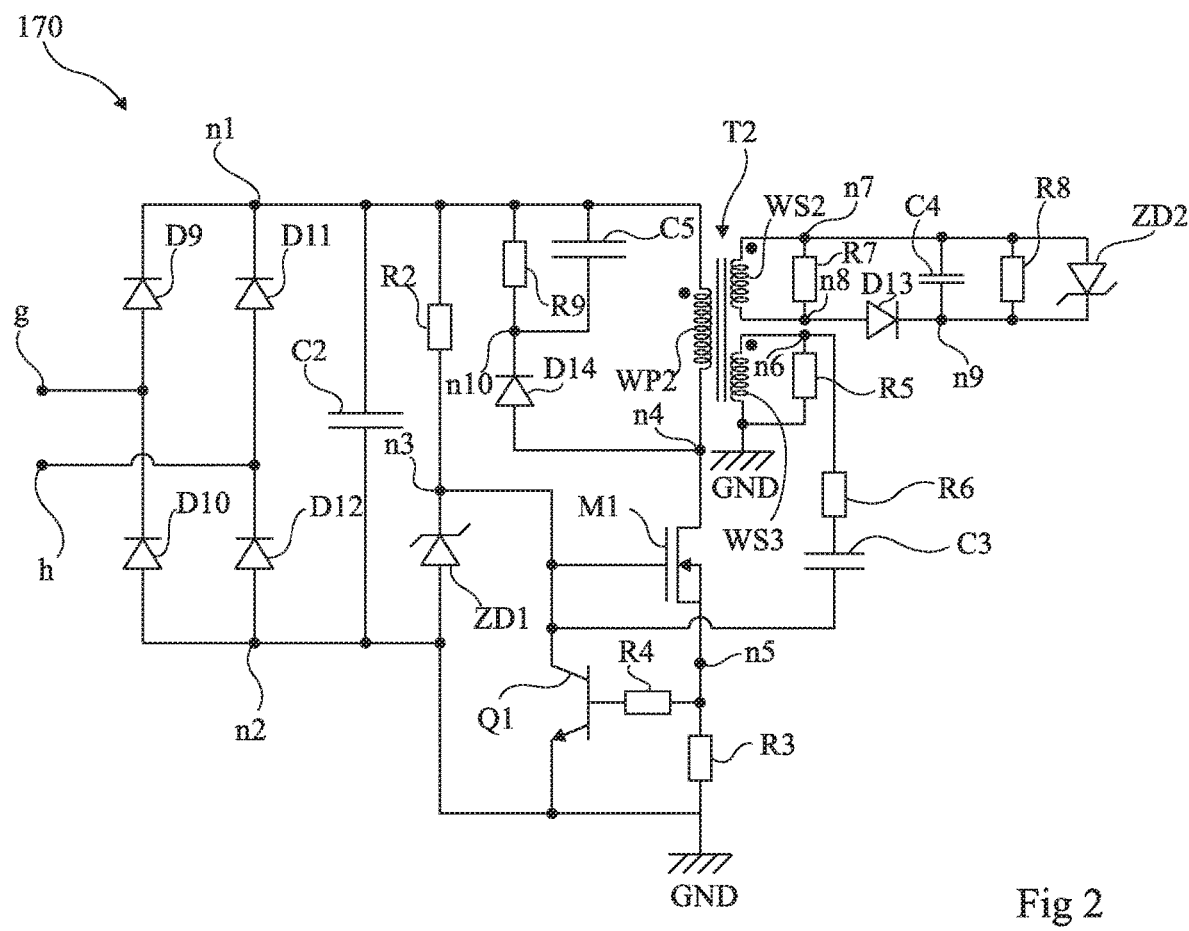
FIG. 2 is an electric diagram illustrating in further detail an embodiment of a circuit for powering the converter of FIG. 1.

FIG. 2 is an electric diagram illustrating in further detail an embodiment of the power supply circuit 170 of the converter of FIG. 1.

As discussed hereabove, in the present example, circuit 170 should be able to generate the power supply voltage of the circuits for controlling the normally-on transistors of the converter (for example, in the range from −10 to −30 volts) from an input voltage that may be AC (at the start) or DC (in steady state or during the stopping of the converter). In the case of a DC input power supply voltage, the level thereof may vary within a wide range, for example, from 12 volts to 400 volts. Further, at the starting of the converter, circuit 170 should be able to very rapidly supply the power supply voltage of the circuits for controlling the normally-on transistors (for example within less than from 10 to 30 μs), and this, whatever the phase angle of the input voltage of the converter at the starting time.

The circuit 170 of FIG. 2 comprises a rectifying diode bridge, comprising a first branch comprising two diodes D9 and D10 series-coupled between nodes n1 and n2 and, in parallel with the first branch, a second branch comprising two diodes D11 and D12 series-coupled between nodes n1 and n2. More particularly, in this example, diode D9 has its cathode coupled, preferably connected, to node n1 and its anode coupled, preferably connected, to the cathode of diode D10, and diode D10 has its anode coupled, preferably connected, to node n2. Further, in the present example, diode D11 has its cathode coupled, preferably connected, to node n1 and its anode coupled, preferably connected, to the cathode of diode D12, and diode D12 has its anode coupled, preferably connected, to node n2. The junction point of diodes D9 and D10 is coupled, preferably connected, to the input power supply terminal g of circuit 170, and the junction point of diodes D11 and D12 is coupled, preferably connected, to the input power supply terminal h of circuit 170.

The circuit 170 of FIG. 2 further comprises a smoothing capacitor C2 having a first electrode coupled, preferably connected, to node n1 and a second electrode coupled, preferably connected, to node n2.

Circuit 170 further comprises, in parallel with capacitor C2, a branch comprising a series association of a resistor R2 and of a zener diode ZD1. More particularly, in the present example, resistor R2 has a first end coupled, preferably connected, to node n1 and a second end coupled, preferably connected, to a node n3, and zener diode ZD1 has its cathode coupled, preferably connected, to node n3 and its anode coupled, preferably connected, to node n2.

The circuit 170 of FIG. 2 further comprises an insulation transformer T2. In the shown example, transformer T2 comprises a primary winding WP2 and two secondary windings WS2 and WS3, coupled to primary winding WP2 by electromagnetic coupling. In this example, the winding direction of primary winding WP2 and secondary windings WS2 and WS3 is identical.

Primary winding WP2 has a first end coupled, preferably connected, to node n2, and a second end coupled, preferably connected, to a node n4.

Circuit 170 further comprises a transistor M1 coupling, by its conduction nodes, node n4 to a node GND of application of a reference potential of the circuit, for example, the ground. More particularly, in the present example, transistor M1 has a first conduction node coupled, preferably connected, to node n4 and a second conduction node coupled, preferably connected, to a node n5, node n5 being coupled to node GND via a resistor R3. In the shown example, resistor R3 has a first end coupled, preferably connected, to node n5 and a second end coupled, preferably connected, to node GND. Transistor M1 further has a control node coupled, preferably connected, to node n3. As an example, transistor M1 is an N-channel MOS transistor having its drain and its source respectively coupled to nodes n4 and n5 and having its gate coupled to node n3.

The circuit 170 of FIG. 2 further comprises a transistor Q1 coupling, by its conduction nodes, node n3 to node GND. More particularly, in the present example, transistor Q1 has a first conduction node coupled, preferably connected, to node n3 and a second conduction node coupled, preferably connected, to node GND. Transistor Q1 further has a control node coupled to node n5 via a resistor R4. In the shown example, resistor R4 has a first end coupled, preferably connected, to the base of transistor Q1 and a second end coupled, preferably connected, to node n5. As an example, transistor Q1 is an NPN-type bipolar transistor having its collector and its emitter respectively coupled to nodes n3 and GND and having its base coupled to node n5 via resistor R4.

The secondary winding WS3 of transistor T2 has a first end coupled, preferably connected, to a node n6 and a second end coupled, preferably connected, to node GND. The circuit 170 of FIG. 2 further comprises a resistor R5 connected in parallel with secondary winding WS3. More particularly, in the present example, resistor R5 has a first end coupled, preferably connected, to node n6, and a second end coupled, preferably connected, to node GND. The circuit 170 of FIG. 2 further comprises a series association of a resistor R6 and of a capacitor C3 between nodes n6 and n3. More particularly, in the present example, resistor R6 has a first end coupled, preferably connected, to node n6 and a second end coupled, preferably connected, to a first electrode of capacitor C3, and the second electrode of capacitor C3 is coupled, preferably connected, to node n3.

The secondary winding WS2 of transformer T2 has a first end coupled, preferably connected, to a node n7 and a second end coupled, preferably connected, to a node n8. Circuit 170 further comprises a resistor R7 connected in parallel with secondary winding WS2. More particularly, in the present example, resistor R7 has a first end coupled, preferably connected, to node n7 and a second end coupled, preferably connected, to node n8. The circuit 170 of FIG. 2 further comprises a diode D13 forward-connected between node n8 and a node n9. More particularly, in the present example, diode D13 has its anode coupled, preferably connected, to node n8 and its cathode coupled, preferably connected, to node n9. Circuit 170 further comprises a capacitor C4 having a first electrode coupled, preferably connected, to node n7 and a second electrode coupled, preferably connected, to node n9. Circuit 170 further comprises a resistor R8 having a first end coupled, preferably connected, to node n7 and a second end coupled, preferably connected, to node n9. The circuit 170 of FIG. 10 further comprises a zener diode ZD2 having its anode coupled, preferably connected, to node n7, and its cathode coupled, preferably connected, to node n9.

The assembly comprising secondary winding WS2, resistors R7 and R8, capacitor D4, diode D13, and zener diode ZD2 defines an output path of power supply circuit 170, supplying, between nodes n7 and n9, the power supply voltage of one of the circuits for controlling the converter transistors K1, K2, K3, K4, K5, and K6. This assembly may be replicated as many times as the converter comprises transistor control circuits to be powered. Zener diode ZD2 has the function of clipping the output voltage of circuit 170 at the level required for the control of transistors K1, K2, K3, K4, K5, and K6, for example, at a level in the range from −10 to −30 volts. As a variation, zener diode ZD2 may be replaced with any other circuit capable of regulating or clipping the output voltage of circuit 170. An additional output path may further be provided for the powering of switch 180 of the converter.

In the example of FIG. 2, power supply circuit 170 further comprise a circuit for demagnetizing the leakage inductance of transformer T2, comprising a parallel association of a resistor R9 and of a capacitor C5 connected between node n1 and a node n10, and a diode D14 forward-connected between node n4 and node n10.

The operation of the power supply circuit of FIG. 2 is a two-phase self-oscillating operation.

During a first phase, transistor M1 is on, and a current flows through primary winding WP2 of transformer T2, which stores power in magnetic form. During a second phase, transistor M1 is turned off, and magnetic power is transferred to the secondary.

Network R2, ZD1 ensures the turning on of transistor M1 on powering-on of the circuit. The current increases in a ramp in transistor M1. It is measured by resistor R3. Transistor Q1 is turned on when the voltage across resistor R3 reaches the threshold voltage of transistor Q1, for example, in the order of 0.6 volts. This results in taking the gate of transistor M1 back to the potential of node GND, and thus in blocking transistor M1. The power is then transferred to the secondary via winding WS2 of the transformer. Auxiliary winding WS3 enables to generate a new control order for transistor M1 via network R6, C3, which keeps transistor M1 off for a time period linked to the time constant of network R6, C3. In this example, transistor Q1 is only controlled from time to time, when the voltage across resistor R3 reaches the threshold voltage of transistor Q1. The turning on of switch Q1 causes the turning off of transistor M1 and thus the interruption of the current flowing through resistor R3.

The compatibility with an AC or DC input voltage is ensured by the rectifying bridge formed by diodes D9, D10, D11, and D12.

To allow a fast starting of power supply circuit 170, smoothing capacitor C2 is preferably a low-capacitance capacitor. As an example, capacitor C2 is selected so that, during the converter starting phase, the minimum value of the rectified AC input voltage supplied by diode bridge D9, D10, D11, D12 is just above the operating threshold of power supply circuit 170, for example in the range from 10 to 30 volts. As an example, the capacitance of capacitor C2 is in the range from 100 to 1,000 nF, for example, in the order of 500 nF. The capacitor thus very rapidly charges at the powering on, allowing a fast starting of the converter.

The transformation ratio of transformer T2 (ratio of the output voltage to the input voltage of the transformer, defined by the ratio of the number of spirals of secondary winding WS2 to the number of spirals of primary winding WP2) is preferably high, for example, equal to 1, or even greater than 1, to enable the circuit to rapidly supply an output voltage capable of blocking the normally-on transistors of the converter, even when the power supply voltage of circuit 170 is low. This choice implies a high switching frequency of transistor M1, for example, greater than or equal to 1 MHz, to avoid for the current in primary winding WP2 to exceed a critical value (beyond which the transformer and/or transistor M1 might be damaged) when the input power supply voltage of circuit 170 is maximum. Transformer T2 preferably has primary and secondary inductances of low value to allow an oscillation of the circuit at a high frequency, for example, greater than or equal to 1 MHz. As an example, the primary and secondary inductances of transformer T2 are smaller than 10 µH, for example, in the order of 6 µH.

The gate capacitances of transistors K1, K2, K3, K4, K5, and K6 are preferably low, for example, smaller than 1 nF, to allow the supply of the current necessary to control the transistors while allowing a very fast start of the converter.

The power supply circuit 170 of FIG. 2 operates in open loop, that is, it is not provided to measure the output voltage between nodes n7 and n9 of the circuit to control transistor M1. This allows a very fast start of circuit 170. The voltage-limiting element formed, in the example of FIG. 2, by zener diode ZD2 enables to regulate the output voltage of circuit 170.

Various embodiments and variations have been described. It will be understood by those skilled in the art that certain features of the various embodiments and variations may be combined, and other variations will occur to those skilled in the art. In particular, the described embodiments are not limited to the specific example of switched-mode converter architecture described in relation with FIG. 1. More generally, the provided solution may be adapted to any switched-mode converter comprising at least one normally-on switching transistor, and a power storage capacitor coupled to terminals of application of an input signal of the converter via a current-limiting element. Switch 180 is then configured to, during a converter starting phase, couple the power supply terminals g and h of circuit 170 for powering the circuits for controlling the normally-on transistors to the terminals of application of the converter input signal, upstream of the current limiting element. This enables to ensure the fast blocking of the normally-on transistors of the converter at the starting. At the end of the starting phase, switch 180 connects the power supply terminals g and h of circuit 170 to the terminals of the storage capacitor. This enables to properly manage the stopping of the converter when the input signal of the converter is interrupted, by using the energy of the storage capacitor to maintain off the normally-on transistor(s) of the converter during the stopping phase.

The described embodiments are further not limited to the embodiment of the power supply circuit 170 described in relation with FIG. 2.

Further, the described embodiments are not limited to the above-mentioned examples of semiconductor materials for the forming of the normally-on transistor(s) of the converter, that is, silicon carbide or gallium nitride. More generally, the described embodiments may be implemented whatever the type of normally-on transistor used, for example, transistors made up of diamond or transistors made up of gallium oxide ($Ga_2O_3$).

It should further be noted that in the example of the AC/DC converter of FIG. 1, the diodes D1 and D2 of stage 130 may be replaced with controlled transistors, for example, normally-off transistors, for example, MOS transistors made up of silicon.

Finally, the practical implementation of the described embodiments and variations is within the abilities of those skilled in the art based on the functional indications given hereabove, in particular as to the values to be given to the resistors, to the capacitors, and to the diodes.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power converter comprising:
   first and second terminals of application of an input signal;
   a power storage capacitor having first and second electrodes respectively coupled to the first and second terminals of application of the input signal via a current-limiting element;
   at least one normally-on transistor;
   a power supply circuit capable of generating a signal for powering a circuit for controlling said at least one normally-on transistor; and
   a switch configurable to, in a first configuration, couple first and second input terminals of the power supply circuit respectively to the first and second terminals of application of the input signal, upstream of the current-limiting element and, in a second configuration, connect the first and second input terminals of the power supply circuit respectively to the first and second electrodes of the storage capacitor, downstream of the current-limiting element,
   wherein, the power converter is configured to, during a converter starting phase;
   control the switch to the first configuration;
   when the voltage supplied by the power supply circuit is sufficient, block said at least one normally-on transistor; and then
   when the voltage across the storage capacitor exceeds a first predetermined threshold, control the switch to the second configuration.

2. The converter of claim 1, configured to, during a converter stop phase:
   block said at least one normally-on transistor and hold the switch in the second configuration; and then
   when the voltage across the storage capacitor falls under a second predetermined threshold, control the switch to the first configuration.

3. The converter of claim 1, wherein the input signal applied to the first and second input terminals of the converter is an AC voltage.

4. The converter of claim 1, wherein the current-limiting element comprises an input inductance and/or an inrush current limiting resistor.

5. The converter of claim 1, wherein the switch comprises a double-throw electromechanical relay.

6. The converter of claim 1, comprising an AC/DC conversion stage comprising a first controlled bridge comprising a first branch comprising first and second normally-on transistors in series between the first and second electrodes of the storage capacitor and, in parallel with the first branch, a second branch comprising first and second switches in series between the first and second electrodes of the storage capacitor, the junction point of the first and second normally-on transistors of the first branch and the junction point of the first and second switches of the second branch being respectively coupled to the first second terminals of application of the input voltage of the converter via the current limiting-element.

7. The converter of claim 6, further comprising a DC/DC conversion stage comprising a second controlled bridge comprising a first branch comprising third and fourth normally-on transistors in series between the first and second electrodes of the storage capacitor and, in parallel with the first branch, a second branch comprising fifth and sixth normally-on transistors in series between the first and second electrodes of the storage capacitor.

8. The converter of claim 7, wherein the DC/DC conversion stage further comprises a transformer comprising a primary winding comprising first and second ends respectively coupled to the junction point of the third and fourth normally-on transistors of the first branch of the second bridge and to the junction point of the fifth and sixth normally-on transistors of the second branch of the second bridge, via a resonant circuit.

9. The converter of claim 8, wherein the transformer of the DC/DC conversion stage further comprises a secondary winding comprising first and second ends respectively coupled to first and second output terminals of the converter via a rectifying diode bridge.

10. The converter of claim 1, wherein the power supply circuit is a self-oscillating circuit comprising a transformer comprising a primary winding series-coupled with a switching transistor, at least one first secondary winding supplying the signal for powering the control circuit of said at least one normally-on transistor, and a second secondary winding supplying a signal for controlling the switching transistor.

11. The converter of claim 10, wherein the power supply circuit further comprises a rectifying diode bridge comprising first and second input nodes respectively coupled to the first and second input terminals of the power supply circuit, and first and second output nodes respectively coupled to first and second ends of the series association of the primary winding of the transformer of the power supply circuit and of the switching transistor.

12. The converter of claim 10, wherein the power supply circuit further comprises a smoothing capacitor in parallel with the series association of the primary winding of the transformer of the power supply circuit and of the switching transistor.

* * * * *